US006482258B2

(12) United States Patent
Styron

(10) Patent No.: US 6,482,258 B2
(45) Date of Patent: Nov. 19, 2002

(54) FLY ASH COMPOSITION FOR USE IN CONCRETE MIX

(75) Inventor: Robert William Styron, Marietta, GA (US)

(73) Assignee: Mineral Resource Technologies, LLC, Atlanta, GA (US)

( * ) Notice: Subject to any disclaimer, the term of this patent is extended or adjusted under 35 U.S.C. 154(b) by 0 days.

(21) Appl. No.: 09/888,691

(22) Filed: Jun. 25, 2001

(65) Prior Publication Data

US 2002/0033119 A1 Mar. 21, 2002

Related U.S. Application Data

(63) Continuation-in-part of application No. 09/493,370, filed on Jan. 28, 2000, now Pat. No. 6,251,178.

(51) Int. Cl.[7] .................................................. C04B 7/13
(52) U.S. Cl. ................... 106/709; 106/706; 106/DIG. 1
(58) Field of Search ................................ 106/706, 709, 106/DIG. 1

(56) References Cited

U.S. PATENT DOCUMENTS

| | | | |
|---|---|---|---|
| 4,121,845 A | | 10/1978 | Hurst et al. |
| 4,226,630 A | | 10/1980 | Styron |
| 4,313,753 A | | 2/1982 | Segawa et al. |
| 4,328,037 A | | 5/1982 | Demirel et al. |
| 4,624,711 A | | 11/1986 | Styron |
| 4,640,715 A | | 2/1987 | Heitzmann et al. |
| 4,842,649 A | * | 6/1989 | Heitzmann et al. ......... 106/706 |
| 4,877,453 A | | 10/1989 | Loggers |
| 4,961,790 A | | 10/1990 | Smith et al. |
| 4,997,484 A | | 3/1991 | Gravitt et al. |
| 5,196,620 A | | 3/1993 | Gustin et al. |
| 5,227,047 A | | 7/1993 | Hwang |
| 5,299,692 A | | 4/1994 | Nelson et al. |
| 5,352,288 A | | 10/1994 | Mallow |
| 5,374,308 A | | 12/1994 | Kirkpatrick et al. |
| 5,387,283 A | | 2/1995 | Kirkpatrick et al. |
| 5,439,518 A | | 8/1995 | Francis et al. |
| 5,456,363 A | | 10/1995 | Groppo et al. |
| 5,489,334 A | | 2/1996 | Kirkpatrick et al. |
| 5,490,889 A | * | 2/1996 | Kirkpatrick et al. ........ 106/705 |
| 5,513,755 A | | 5/1996 | Heavilon et al. |
| 5,584,926 A | | 12/1996 | Borgholm et al. |
| 5,624,491 A | | 4/1997 | Liskowitz et al. |
| 5,714,003 A | | 2/1998 | Styron |
| 5,997,632 A | | 12/1999 | Styron |
| 6,251,178 B1 | * | 6/2001 | Styron ......................... 106/706 |

FOREIGN PATENT DOCUMENTS

EP 346416 * 5/1993

OTHER PUBLICATIONS

Proposed Aashto Guide Specification For Highway Construction, 1998; Developed and submitted by the Aashto Lead State Team on ASR: pp. 1–8 (No month).
Stark, D., Lithium Salt Admixtures–An Alternative Method to Prevent Expansive Alkali–Sinca Reactivity, 9th International Conference on Alkali–Aggregate Reaction in Concrete, London, Jul. 1992; pp. 1–6.
Alkali–silica reactivity inhibitor; Boral Material Technologies Inc.; Jan. 2000.
Alkali–Silica Reactivity Inhibitor Admisture; Broal Material Technologies Inc.; Sep. 2000.
Stokes et al., A Lithium–Based Admixture for ASR Control That Does Not Increase the Pore Solution pH; Fifth CAN-MET/ACI International Conference on Superplasticizers and Other Chemical Admixtures: 1997 (No month).
Ramachandran, "Concrete Admixtures Handbook–Properties, Science and Technology", Noyes Publication, p. 526, 1984 (no month).
Appendix F, "Handbook for the Identification of Alkali–Silica Reactivity in Highway Structures," Strategic Highway Research Program, 1991 (no month).
"Guide to Alkali–Aggregate Reactivity," Mid–Atlantic Regional Technical Committee, Jun., 1993.
Helmuth, "Alkali–Silica Reactvity: An Overview of Research," Strategic Highway Research Program, 1993 (no month).
Stark et al., "Eliminating or Minimizing Alkali–Silica Reactivity," Strategic Highway Research Program, 1993 (no month).
Chemical Abstracts Search, Sep. 24, 1997.
Dialog Article Search, Sep. 25, 1997.
Section 03050 Alkali–Silica Reactivity Inhibitor Admixture Product Guide Specification, Boral Material Technologies Inc.;Sep. 2000.

* cited by examiner

*Primary Examiner*—Anthony J. Green
(74) *Attorney, Agent, or Firm*—Killworth, Gottman, Hagan & Schaeff, L.L.P.

(57) ABSTRACT

A fly ash composition is provided which includes a blend of Class C fly ash, potassium carbonate, and lithium carbonate, which, in combination, reduce alkali silica reactivity when the fly ash composition is used in concrete applications. The fly ash composition includes from about 65 to 99 wt % Class C fly ash, from about 0.1 wt. % to about 4 wt % potassium carbonate, and from about 0.1 wt. % to about 4 wt. % lithium carbonate.

6 Claims, No Drawings

FLY ASH COMPOSITION FOR USE IN CONCRETE MIX

CROSS REFERENCE TO RELATED APPLICATIONS

This application is a continuation-in-part of U.S. application Ser. No. 09/493,370 filed Jan. 28, 2000, now U.S. Pat. No. 6,251,178.

BACKGROUND OF THE INVENTION

The present invention is directed to a fly ash composition, and more particularly, to a fly ash composition which has a reduced susceptibility to alkali-silica reactivity when used in cementitious compositions.

Fly ash comprises finely divided inorganic products produced by the combustion of coal. Enormous amounts of fly ash are produced annually nationwide, principally from burning coal in electric power plants. Disposal of fly ash poses an increasingly difficult problem because the volume, the particulate nature and the varied chemical composition of fly ash limit the number of acceptable disposal sites. Such sites require sophisticated and expensive engineering, design, construction and operational controls to be in place to manage and dispose of the fly ash. Furthermore, the capacity of these disposal sites is not unlimited.

In recent years, fly ash has been proposed for use in cement compositions. For example, U.S. Pat. No. 4,382,649 to Heitzmann et al. describes a cement composition which contains fly ash. The composition contains from 50 parts to about 80 parts portland cement; from 13 parts to about 35 parts fly ash; and from 1 part to about 5 parts potassium carbonate. The composition may additionally include up to about 10 parts metakaolin; up to about 6 parts slag; and up to 4 parts of an admixture. However, such a composition may be subject to alkali silica reactivity.

Chemical reactions between alkalies and aggregates in concrete mixtures result in a shorter useful life and deterioration of structures formed from the concrete mixture. The alkali compounds in the mixture react with certain aggregates in the concrete, resulting in an increased pH of the pore solution in the concrete. For such reactions to take place, the concrete must be subjected to a certain amount of moisture during service.

Concrete is essentially a two-component system comprising a paste portion and an aggregate portion. The paste portion is a product of the hydration reaction between the cementitious materials and water. The paste portion is formed from a matrix of solid material with an internal network of interconnected pores. When water enters these pores, it moves through the pores, solubilizing salts of calcium and alkali metals. As these salts are dissolved, the pH of the pore solution increases as a result of an increase of hydroxide ions in the pores. As the hydroxide ions react with reactive silica in the aggregate to solubilize the silica, a gel is produced which may cause the concrete to crack and/or deteriorate. Researchers believe that this cracking is a result of the gel absorbing water.

Both Class F and Class C fly ash have been proposed for a partial replacement of cement in concrete mixes in order to reduce alkali-silica reactivity. However, it would be desirable to be able to replace larger amounts of cement to provide greater protection from alkali-silica reactivity.

Thus, a need has developed in the art for a fly ash composition which is less susceptible to alkali silica reactivity when used to form a concrete mix.

SUMMARY OF THE INVENTION

The present invention meets that need by providing a fly ash composition including a blend of Class C fly ash, potassium carbonate, and lithium carbonate which results in reduced alkali-silica reactivity of concrete formed using the fly ash composition. The fly ash composition of the present invention can be used in cementitious and concrete compositions and may be formulated to have a wide range of curing times so that it can be used for a variety of purposes from patching to making concrete objects.

According to one aspect of the present invention, a fly ash composition for use in a concrete mix is provided comprising from about 65 wt. % to about 99% wt. % Class C fly ash; from about 0.1 wt. % to about 4 wt. % of lithium carbonate, from about 0.1 to about 5 wt % potassium carbonate, and from about 0.1 to about 26% by weight of a retarding agent. The retarding agent is included in the composition to aid in controlling the rate of set of the resulting cement/concrete mix and is preferably selected from the group consisting of borax, boric acid, citric acid, metakaolins, and blends thereof. In one embodiment, the retarding agent comprises from about 0.1 to 10% by weight metakaolin. In an alternative embodiment, the retarding agent comprises from about 0.1 to 4 wt % Borax, from about 0.1 to 4 wt % boric acid, from about 0.1 to 8 wt % citric acid, and from about 0.1 to 10 wt % by weight metakaolin.

The fly ash composition preferably further includes from about 0.1 to 5 wt % of a chelating agent to enhance the strength of the resulting cement mix.

In another embodiment of the invention, a concrete mix is provided comprising stone, sand, water, and Portland cement, where the mix includes from about 25 to 40 wt % Class C fly ash, from about 0.1 wt. % to about 4 wt. % of lithium carbonate, from about 0.1 wt. % to about 5 wt. % potassium carbonate, and from about 0.1 to about 26% by weight of a retarding agent.

In yet another embodiment of the invention, a concrete mix is provided comprising stone, sand, water, and Portland cement, from about 25 to 65 wt % Class C fly ash, from about 0.1 wt. % to about 4 wt. % of lithium carbonate, from about 0.1 wt. % to about 5 wt. % potassium carbonate, and from about 0.1 to about 26% by weight of a retarding agent.

Accordingly, it is a feature of the present invention to provide a fly ash composition and concrete mix including a blend of fly ash, lithium carbonate, and potassium carbonate which results in reduced alkali-silica reactivity. Other objects and advantages of the present invention will become apparent from the following detailed description and the appended claims.

DETAILED DESCRIPTION OF THE PREFERRED EMBODIMENT

The fly ash composition and concrete mix of the present invention provide several advantages over prior art compositions. We have found that by using a blend of fly ash, lithium carbonate, and potassium carbonate, the potential for alkali-silica reactivity is greatly reduced. In addition, we have found that the addition of potassium carbonate allows for the inclusion of a higher portion of fly ash as a replacement for Portland cement in concrete mixes, which also reduces the potential for alkali-silica reactivity. We have also found that the fly ash composition reduces alkali-silica reactivity to acceptable levels when added to high alkali cements, i.e., cements containing an equivalent amount of alkalies (expressed as $Na_2O+0.658\ K_2O$) greater than 0.60% by weight.

Class C fly ash is preferred for use in the present invention. Typically, this type of fly ash has a lime content of greater than or equal to about 25%. The typical composition of Class C fly ash used in the present invention is set forth in Table 1 below.

TABLE 1

| Component | Weight % |
|---|---|
| $SO_3$ | 0.23 to 3% |
| CaO | 3.5 to 40% |
| MgO | 2.5–25% |
| $SiO_2$ | 1–12% |
| $Al_2O_3$ | 0.5–40% |
| Available Alkalies | 0–4% |

It should be noted that Class C fly ash does not produce calcium hydroxide when hydrated with water (calcium hydroxide must be present in order to initiate an alkali-silica reaction).

The fly ash composition also includes from about 0.1 to 4 wt % lithium carbonate. The addition of lithium carbonate is thought to form lithium silicate compounds which prevent the formation of an expansive gel which disrupts the hardened concrete structure during the alkali-silica reactivity process.

The fly ash composition includes from about 0.1 to 4 wt % potassium carbonate, which allows a greater replacement of Portland cement by fly ash in the concrete mixture, which in turn provides greater protection from alkali-silica reactivity.

The fly ash composition also includes from about 0.1 to 26 wt % of a retarding agent such as borax, boric acid, citric acid and high alumina clays in order to control the rate of set of the cement. Preferred high alumina clays are metakaolins. Suitable metakaolins are commercially available from a number of sources including Huber Corporation, Burgess Pigment Co. and Southern Clay Products. A preferred metakaolin is Opti White, available from Burgess Pigment Co.

Suitable chelating agents for inclusion in the fly ash composition/concrete mix include Versene™, commercially available from The Dow Chemical Company. We have found that the addition of a chelating agent helps to provide a significant increase in compressive strength when the composition is formed into a cement/concrete mix.

The fly ash composition is formed by blending all of the components thoroughly. Concrete mixes formed from the fly ash composition of the present invention are preferably prepared in a conventional manner using stone and sand mixed with water and Portland cement. The fly ash composition is preferably added to the cement mixture at the same time as the cement. The concrete mix may also include conventional water reducing agents and/or air entraining agents.

The fly ash composition of the present invention may be used in concrete mixes used to form objects including, but not limited to, concrete masonry units, such as bricks, blocks, and tiles; concrete pipe; prestress concrete; specialty concrete units, such as burial vaults, septic tanks, and prefabricated concrete units; roadways; and ornamental objects and statuary.

Concrete objects formed from the fly ash composition/concrete mix of the present invention do not require special curing equipment or processes. The curing time of the concrete mixes of the present invention can be adjusted by adjusting the concentrations of the various ingredients in the fly ash compositions and/or the concrete mixes. For example, conventional masonry units are heated in a kiln, and/or steam cured for periods of time which often exceed 24 hours. On the other hand, masonry units formed using the fly ash compositions and concrete mixes of the present invention do not require either heating or steam curing because the fly ash compositions and the concrete mixes of the present invention can be formulated to set and cure in less than one hour and, preferably, when forming masonry units, can be formulated to set and cure to a required strength in about 30 minutes. Further, concrete objects formed from the fly ash compositions and concrete mixes of the present invention exhibit negligible, if any, water absorption.

The fly ash/cementitious compositions and concrete mix of the present invention can also be used to construct concrete articles such as roadways. Because the compositions of the present invention can be formulated for quick curing and high strength, a roadway, which is constructed using the fly ash/cementitious compositions or concrete mix of the present invention, can be laid and ready for use in less than 24 hours. The quick curing nature of such compositions is particularly attractive in areas which experience high roadway usage and traffic. Further, roadways formed from the compositions of the present invention will have an improved useful life and strength when compared to asphalt.

It should be appreciated that the fly ash composition/concrete mixes of the present invention have a wide variety of uses and that not all of those uses have been described herein.

While certain representative embodiments and details have been presented for purposes of illustrating the invention, it will be apparent to those skilled in the art that various changes in the fly ash compositions and concrete mixes disclosed herein may be made without departing from the scope of the invention, which is defined in the appended claims.

What is claimed is:

1. A fly ash composition for use in a concrete mix comprising from about 65 wt. % to about 99% wt. % Class C fly ash; from about 0.1 wt. % to about 4 wt. % of lithium carbonate, from about 0.1 to about 5 wt % potassium carbonate, from about 0.1 to about 26% by weight of a retarding agent, and from about 0.1 to about 5% by weight of a chelating agent.

2. The fly ash composition of claim 1 wherein said retarding agent is selected from the group consisting of borax, boric acid, citric acid, metakaolins, and blends thereof.

3. The fly ash composition of claim 1 wherein said retarding agent comprises about 0.1 to 10 wt % metakaolin.

4. The fly ash composition of claim 1 wherein said retarding agent comprises from about 0.1 to 4 wt % Borax, from about 0.1 to 4 wt % boric acid, from about 0.1 to 8 wt % citric acid, and from about 0.1 to 10 wt % by weight metakaolin.

5. A concrete mix comprising stone, sand, water, and Portland cement, said mix including from about 25 to 40 wt % Class C fly ash, from about 0.1 wt. % to about 4 wt. % of lithium carbonate, from about 0.1 wt. % to about 5 wt. % potassium carbonate, from about 0.1 to about 26% by weight of a retarding agent, and from about 0.1 to 5% by weight of a chelating agent.

6. A concrete mix comprising stone, sand, water, and Portland cement, said mix including from about 25 to 65 wt % Class C fly ash, from about 0.1 wt. % to about 4 wt. % of lithium carbonate, from about 0.1 wt. % to about 5 wt. % potassium carbonate, from about 0.1 to about 26% by weight of a retarding agent, and from about 0.1 to 5% by weight of a chelating agent.

* * * * *